May 26, 1970  R. E. PERHAM  3,514,073
PRESSURE PULSE GENERATOR
Filed June 20, 1968  2 Sheets-Sheet 1
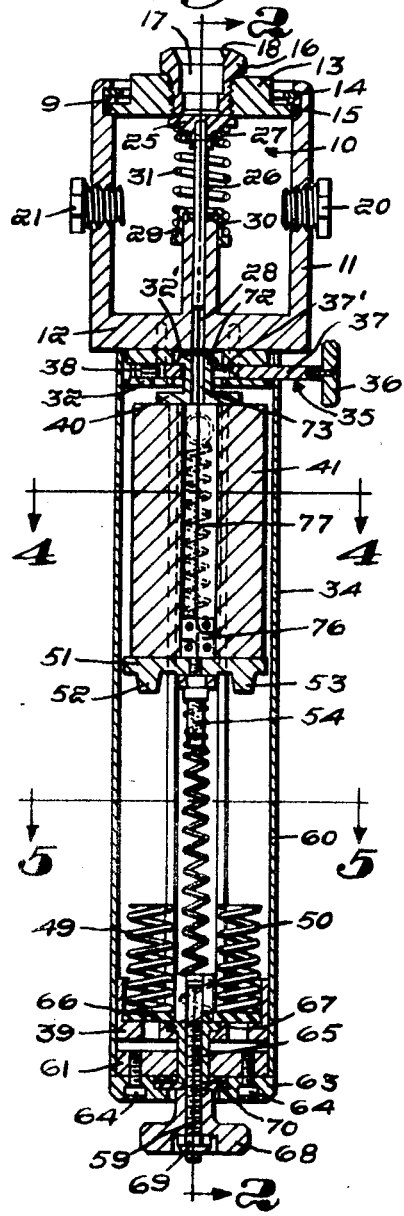
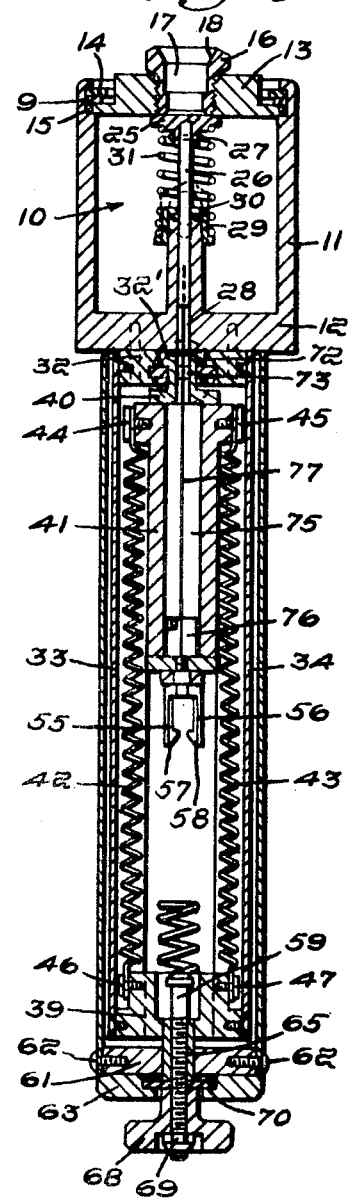
Inventor:
Roscoe E. Perham,
By: Harry M. Saragovitz,
Edward J. Kelly, Herbert Berl &
Lawrence E. Labadini  Attorneys May 26, 1970  R. E. PERHAM  3,514,073
PRESSURE PULSE GENERATOR
Filed June 20, 1968
2 Sheets-Sheet 2
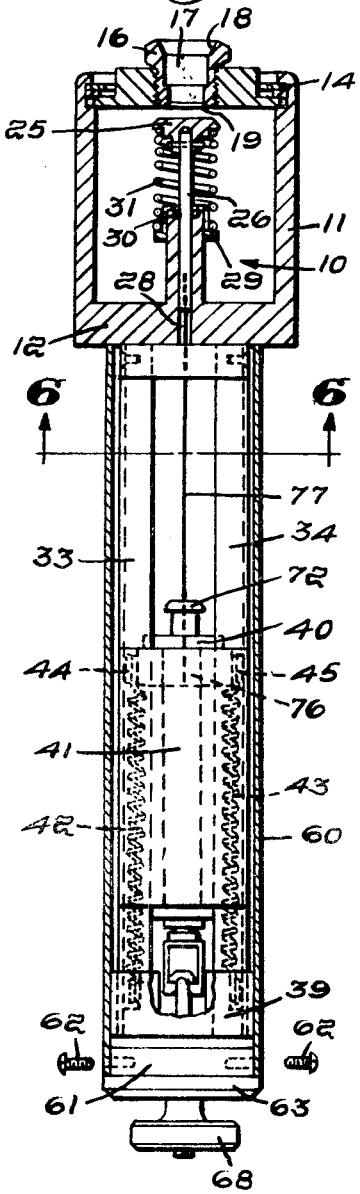
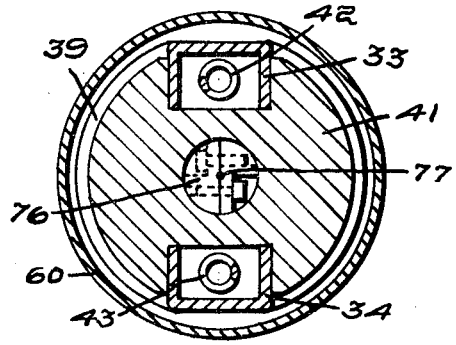
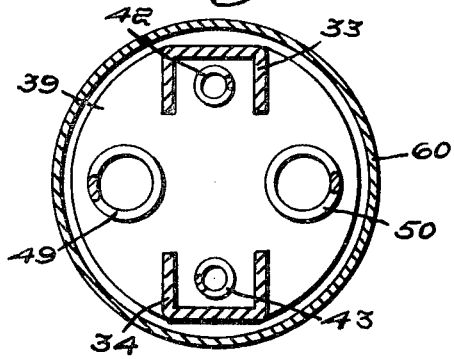
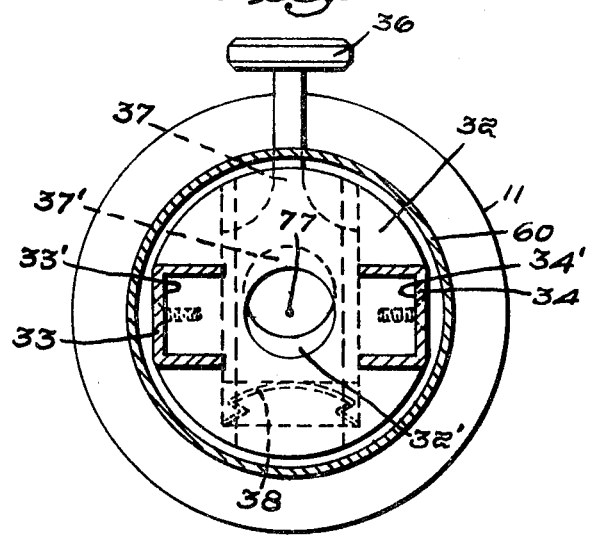
Inventor:
Roscoe E. Perham,
by: Harry M. Saragovitz,
Edward J. Kelly, Herbert Berl &
Lawrence E. Labadini  Attorneys

United States Patent Office 3,514,073
Patented May 26, 1970

3,514,073
PRESSURE PULSE GENERATOR
Roscoe E. Perham, Lebanon, N.H., assignor to the United States of America as represented by the Secretary of the Army
Filed June 20, 1968, Ser. No. 738,546
Int. Cl. F16k *31/44, 35/00;* F41f *11/00*
U.S. Cl. 251—76                                 6 Claims

ABSTRACT OF THE DISCLOSURE

A pressure pulse generator having a quick opening mechanical valve wherein the impact forces of a rapidly accelerating mass are employed to lift a poppet valve from its seat.

---

The invention described herein may be manufactured, used, and licensed by or for the Government for governmental purposes without the payment to me of any royalty thereon.

This invention relates to a pressure pulse generator having a quick opening mechanical valve that will provide a pressure pulse rise time of less than one millisecond.

The detection of shock waves in air and the measurement of the pressure effects of such waves is conventionally accomplished by means of pressure transducers which convert the mechanical energy of the shock wave impinging on the transducer into electrical energy. Such pressure transducers, sometimes referred to as blast gages, contain piezoelectric sensing elements, which are crystalline materials capable of generating an electric signal in proportion to the pressure of the shock wave impinging on the crystal. Blast gages are used in conjunction with a suitable recording system which will amplify and graphically display or record the electrical signal.

Because of the variation in sensitivity between different piezoelectric crystals, it is necesary that such gages be calibrated. When the gage and its associated recording system are to be located in the field, then the entire system should be calibrated immediately before or immediately after such use, since environmental conditions will alter the response of the blast gage and the components of the recording system. Such variations in response and sensitivity can best be compensated for in the field by providing a standard pressure wave or calibration signal to each blast gage shortly before the experimental test which would be recorded under exactly the same conditions as the experimental test signal and would, therefore, be available for check and comparison purposes upon completion of the experimental work.

Attempts to develop a pressure pulse generator employing electro-mechanical solenoid valves to provide a standard pressure signal were unsuccessful because the signal generated thereby was too slow for signal acceptance by the system tape recorder. Such electro-mechanical solenoid valves in a pressure chamber provided a pressure pulse with a pressure rise time of the order of 4 to 5 milliseconds. While for many applications such a pressure rise times would be satisfactory in the extremely sensitive equipment required for shock wave phenomenon studies, pressure rise time of the order of 4 to 5 milliseconds are too slow to be accepted by the systems electronic components. In order to be accepted by the recording system, the pressure rise should occur in less than a millisecond. It is known that shock tubes can produce pressure rise times of this magnitude but such shock tubes are obviously not practical for field calibration where the sensing equipment must remain in place.

The apparatus of the present invention, on the other hand, solves the problem of providing an accurate pressure pulse rapidly enough, i.e., less than one millisecond, to effect a 2 kHz. equivalent rise time signal from the gage. Further, the device is constructed of simple mechanical elements, is manually operated and can be hand-carried to calibrate field installations of blast gages.

The pressure pulse generator of the present invention comprises a pressurized gas chamber having an opening therein which is normally closed by a poppet valve. A blast gage to be calibrated is connected to the opening of the gas chamber and the valve is rapidly opened to produce a pressure pulse of predetermined magnitude on the face of the gage. The rapid opening of the valve is accomplished by accelerating a mass to a desired speed, whereupon the mass impacts against a non-elastic extension of the valve stem to lift the valve from its seat at essentially the same velocity as the velocity of the accelerating mass at the moment of impact.

It is, therefore, an object of the present invention to provide a pressure pulse generator capable of providing an accurate pressure pulse with a pressure rise time of less than one millisecond.

It is also an object to provide the pressure pulse generator that will deliver an accurate pressure pulse to a blast gage rapidly enough to effect a 2 kHz. equivalent rise time signal from the blast gage.

A still further object is to provide a hand-carried pressure pulse generator which meets the foregoing objects and is simple, rugged and safe to operate.

Other objects and features of the present invention, as well as many advantages thereof, will become apparent to those skilled in the art from a consideration of the following description, the appended claims, and the accompanying drawings in which:

FIG. 1 is a section in elevation of an embodiment of the invention; and
FIG. 2 is a section of the device of FIG. 1 taken on the line 2—2; and
FIG. 3 is a partial section as in FIG. 2 with the poppet valve in open position; and
FIG. 4 is a cross-section on the line 4—4 of FIG. 1; and
FIG. 5 is a cross-section on the line 5—5 of FIG. 1; and
FIG. 6 is a cross-section on the line 6—6 of FIG. 3.

Referring to the drawings and particularly to FIG. 1, there is shown an embodiment of the present invention which is able to provide an accurate pressure pulse having a pressure rise time of less than one millisecond. The pressure pulse is delivered to a blast gage, not shown, from a pressure chamber 10, which is formed of a cylindrical housing 11 having an end wall portion 12 at one end thereof and an end plate 13 held over the opposite end. End plate 13 is held in place by a retaining ring 14, and is positioned and sealed by a rubber O-ring 15 and split gland washer 9 which are trapped in a dimensionally controlled groove. An annular blast gage adaptor 16 is located within an aperture in the center of the end plate, providing an open passageway 17 leading from the interior of the pressure chamber to the exterior thereof. The outer face of said adaptor 16 has a beveled surface 18 which will accommodate and fit over a number of blast gages of different sizes and, as appears in FIG. 3, the inner end 19 of the adaptor 16 functions as a valve seat.

Inserted in the pressure chamber housing 11 is a reducing bushing 20, having internal threads which are adapted to threadably receive a precision pressure gage, not shown, for measuring the pressure within the chamber. Another reducing bushing 21 in said housing is adapted to threadably engage an externally threaded fitting at the end of a flexible hose which connects to a source of air under pressure, such as a supply tank, not shown in the drawings. Pressure would be supplied from the tank to the chamber 10 as required through a conventional shut-off valve and the pressure would be adjusted by means of a suitable small bleed-off valve. Said air pressure supplying apparatus is conventional in the art, and not being part of this invention, is not shown in the drawings.

Poppet valve 25, an annular disc larger than valve seat 19, completely covers and seals the opening into passageway 17. A straight, rigid, cylindrical valve stem 26 is attached at one end of the valve 25 by spring pin 27 with the coupling slightly loose to let the valve seat evenly, without the need for extreme tolerance control. The opposite end of the valve stem passes through a cylindrical passageway 28 in the end wall portion 12 which passageway acts as a guide for the stem. Flanged hood 29, having a central opening which is in register with passageway 28 and through which stem 26 can pass, serves as a spring seat and a retainer for a seal 30 which provides a pressure-tight seal around the stem. Valve spring 31, having a spring rate of 8.5 lbs per sq. inch, is seated on flange hood 29 and exerts slight presure on valve 25 holding the valve against the valve seat 19. With the valve closed, the pressure chamber is air-tight and able to contain air or other gas under pressure.

Affixed to the rear of the end wall portion 12 is an annular forward mounting plate 32 which acts as an attachment point for guide rails 33 and 34, and as a guide for a sliding catch 35. A circular opening or passage 32' is located in the center of the forward mounting plate aligned with pasageway 28. On opposite sides of the mounting plates are flat support surfaces 33' and 34' against which the ends of the guide rails 33 and 34 are fastened by screw fasteners as shown in FIG. 6. Extending downwardly through two opposed keyways in the forward mounting plate is a sliding catch 35, consisting of a thumb plate 36 attached to a catch plate 37. A catch spring 38 supports the catch plate in its locking position. In the center of the catch plate, there is a circular opening 37', the center point of which can be placed in axial alingment with the center of passageway 32' by forcing the catch plate downwardly against the pressure of the spring.

U-shaped guide rails 33 and 34, attached respectively at one end to opposite sides 33' and 34' of the forward mounting plate 32 and at the other end respectively to opposite sides of an annular end plate 39, serve to support and provide a restricted slideway along which a cylindrical metal sliding weight 41 may travel. Two acceleration springs 42 and 43 are attached to the sliding weight 41 by cap screws 44 and 45 and to the end plate 39 by cap screws 46 and 47. The springs, which lie within the inwardly directed channels of the guide rails, serve to place the sliding weight under tension when locked in an armed position as shown in FIGS. 1 and 2 and when released from the armed position accelerate the sliding weight toward the end plate 39. Attached to the end plate 39, between the attachment points for the acceleration springs, are short bumper springs 49 and 50 having a spring rate of approximately 330/lbs. per inch which serve to stop the rapidly accelerating weight 41. A spring bumper plate 51, having projections 52 and 53 which are adapted to engage the bumper springs is attached to the forward end of the sliding weight 41. Projecting forwardly of the center of the spring bumper plate 51 is a bifurcated catch work 54 formed, as is shown in FIG. 2, of a pair of spaced apart tines 55 and 56 of spring steel having beveled nibs 57 and 58 on the inside surface of the extremities thereof. The tines are adapted to spread apart and the nibs engage and lock to a catch screw 59 which projects from the center of the end plate.

An open end cylindrical cover 60 attached to a cover end plate 61 by means of screws 62, is adapted to fit over and cover the sliding weight, springs and guide rails as shown in FIGS. 1, 2 and 3. Cover clamping plate 63 is attached to the cover end plate 61 by screws 64. The cover 60 is locked in position to end plate 39 by means of a cover lock 65, having diametrically opposed projections 66 at the end thereof which are adapted to be inserted within recesses 67 in the end plate 39. The cover lock 65 is bolted to locking knob 68 by catch screw 59 and lock nut 69, and is held in place in the cover within a recess formed between cover end plate 61 and cover clamping plate 63. A spring washer 70 is also located in the recess and serves to spring load the cover lock to prevent its accidental movement.

Sliding weight 41, as shown in FIGS. 1 and 2, is locked in the armed position by the sliding catch 35, which traps a catch stud 40 secured to the front end of said weight. The catch stud has an axial bore 73 in register with the axis of passageway 28, and has a beveled boss 72 at one end thereof which is held by the catch plate 37. Pressure on the thumb plate, forcing the catch plate downwardly against the resistance of the catch spring, releases the catch stud 40. A bore 75 extends through the longitudinal axis of the sliding weight 41 and communicates with and is aligned with bore 73 of the catch stud at one end and at the opposite end terminates against spring bumper plate 51. Located within said bore 75 is a solid cylindrical cable slider 76, adapted to freely slide along the length of said bore. The cable slider is trapped within said bore by the spring bumper plate 51 which closes off one end of the bore and by the catch stud 40 whose bore 73 is substantially smaller than the bore 75, and prevents the escape of the cable slider at this end. A length of fine, strong, wire cable 77 is attached to the cable slider 76 from which it extends through bore 75, bore 73, and passageway 28 and is attached to the valve stem 26. This cable serves as an extension of the valve stem. The length of the cable is such that the cable slider 76, at the end thereof, will be impacted by the face of catch stud 40 before the sliding weight reaches the end of its travel.

To operate the pressure pulse generator, it is desirable to first arm the device by placing the sliding weight under spring tension. In order to arm the device, it is necessary to remove the cover 60 which is accomplished by a 90 degree turn of the locking knob 68 which turns projections 66 of the cover lock 65 out of recesses 67 in the end plate 39. The cover and locking assembly are then withdrawn as a unit. The sliding weight is manually moved toward the sliding catch 35 until the circular projection 72 of the catch stud 40 passes throgh the opening 37' in catch plate 37. Catch spring 38 then pushes the catch plate upwardly, so as to trap and restrain the projection 72 on the catch stud. Springs 42 and 43 have been stretched and hold the sliding weight under tension. At this point, the cover 60 is replaced and the locking knob 68 turned to 90 degrees to lock the cover assembly in position.

With the device thus armed, the desired pressure is introduced into the pressure chamber 10 from a pressure tank or other supply of pressure. The pressure pulse generator is now ready to deliver a pressure pulse to a blast gage or other pressure sensitive device. Blast gage adaptor 16 on the pressure chamber is placed over the face of a blast gage.

With the pressure pulse generator thus mated to the blast gage, downward pressure is directed manually on the thumb plate 36 forcing the catch plate 37 against the resistance of the catch spring 38 and releasing the catch stud 40. When the catch stud is released, the sliding weight is accelerated rapidly by the accelerator springs 42 and 43 toward the end plate 39 until the sliding weight strikes the bumper springs 49 and 50 and is finally caught by the catch screw 59. However, before the weight strikes the bumper springs, the cable slider 76 is struck by the face of the rapidly accelerating catch stud 40, as is shown in FIG. 3, and impact forces then travel rapidly through the wire cable 77 to the valve assembly and jerk the poppet valve rapidly from its seat. Air pressure from the pressure chamber rushes to the blast gage which is preferably less than 1/16-inch below the valve seat. The change in chamber volume is too small, about 1/100 of the volume, to vary the pressure appreciably and the net result is a rapid step change in pressure at the gage. After the pressure pulse has been delivered to the blast gage, the pressure pulse generator is removed and rearmed for the next calibration test.

Essentially, then, this device harnesses impact forces to rapidly lift the poppet valve from its seat. This is accomplished by accelerating a weight with springs to achieve the desired opening speed. At this point, the sliding weight reaches the end of the valve stem extension cable and further travel snaps the valve open. The valve opens in a millisecond or less due to the fact that the small mass of the valve assembly moves after impact with essentially the same velocity as the velocity of the sliding weight at that time. For example, employing a slider weight of 2.3 lbs., it is preferred that the valve parts weigh less than 0.05 lbs. In such a case, using a pair of accelerator springs with a spring rate of 4.8 lbs. per inch each and with a free length of 4½-inches and a load length of 8⅛-inches, the velocity of the sliding weight at impact with the cable slider after a travel of 3-inches is 11¾-feet per second. The velocities of two bodies, such as the sliding weight ($m_1$) and the cable slider ($m_2$), which undergo imperfectly elastic impact are related by the following expression where $$U_2 = V_2 + [m_1(1+e)(V_1-V_2)/(m_1+m_2)]$$

where $U_2$ is velocity of $m_2$ after impact, $V_2$ is velocity of $m_2$ before impact,
$V_1$ is velocity of $m_1$ before impact and
$e$ is the coefficient of impact.

When the velocity of $m_2$ before impact is 0 and its mass is nearly 1/50 that of $m_1$ and the coefficient of impact is 1.0 then solving in the above expression the momentary velocity of the cable slider at impact would be nearly equal to $2V_1$ or for a $V_1$ of 11¾-feet per second, the velocity of the cable slider after impact would be 23½-feet per second. Pertinent evidence indicates that the valve opens with at least the velocity of the sliding weight at the point of impact which indicates an opening time of 1.0 milliseconds. However, since air pressure starts to flow to the face of the blast gage when the valve first cracks open, the maximum calibration pressure is achieved in a fraction of the valve opening time.

The pressure pulse generator of this invention is a completely mechanical combination of elements that can be hand-carried and manually operated and is able to provide a pressure pulse faster than that presently possible with electro-mechanical solenoid valves and roughly of the same order as that produced by diaphragm bursts in shock tubes. Because of the foregoing features, this device is ideal for use in calibrating field installations of blast gages in shock phenomenon studies.

I claim:
1. Apparatus for supplying a pressure pulse including in combination
   a hollow chamber adapted to hold a gas under pressure,
   a valve which controls a communication between the interior and exterior of said chamber,
   means for releasably holding said valve in closed position,
   guide means attached to said chamber,
   a sliding weight retained by and movable along a path defined by said guide means,
   locking means releasably holding the weight in an armed position under tension,
   accelerator spring means connected to said sliding weight providing tension on said weight and accelerating said weight along the path defined by the guide means upon release of said locking means,
   valve extension means attached to said valve, said valve extension means is a cable which extends through said chamber axially of the direction of lift said valve and adapted to be impacted by said accelerating sliding weight with sufficient force to open said valve.

2. Apparatus according to claim 1 wherein the communication between the interior and exterior of said chamber is an annular hollow adaptor inserted in an orifice in said chamber, said adaptor being a tube extending interiorly and exteriorly of said chamber, the interior end of which constitutes the seat for said poppet valve.

3. Apparatus according to claim 2 wherein said guide means are positioned so that said sliding weight is accelerated by said spring means upon release of said locking means along a path that is axially aligned with the axis of lift of said valve.

4. Apparatus according to claim 3 wherein said valve extension cable terminates in a cylindrical cable clamp, said clamp being slidably engaged within and freely movable along an elongated bore located within said sliding weight, said bore being axially aligned with the axis of lift of said valve, said cable clamp being trapped within said bore by an undersized opening through which said cable can pass, said bore being of a length sufficient to permit said weight to achieve the desired acceleration rate before the cable clamp is impacted.

5. Apparatus according to claim 4 wherein said guide means comprises a pair of spaced parallel tracks attached at one end respectively to said chamber and at the other end to an arresting means for said sliding weight, and said accelerator spring means attached to said sliding weight and to said arresting means.

6. Apparatus according to claim 5 wherein a spring releasably holds said valve in closed position, wherein said locking means releasably holding said sliding weight in armed position is a manually operated spring tension sliding catch, said accelerator spring means consisting of two springs attached at one end respectively on opposite sides of said sliding weight and at the other end to opposite sides of said sliding weight arresting means.

References Cited
UNITED STATES PATENTS 2,568,308   9/1951   Wells _____ 124—13

HENRY T. KLINKSIEK, Primary Examiner

U.S. Cl. X.R.

124—11